US012518772B2

(12) United States Patent
Hirvonen et al.

(10) Patent No.: US 12,518,772 B2
(45) Date of Patent: Jan. 6, 2026

(54) CODEC BITRATE SELECTION IN AUDIO OBJECT CODING

(71) Applicant: Samsung Electronics Co., Ltd., Suwon-si (KR)

(72) Inventors: Toni M. Hirvonen, Santa Clarita, CA (US); Carlos Tejeda Ocampo, Tuxtla Gutiérrez (MX)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 18/412,878

(22) Filed: Jan. 15, 2024

(65) Prior Publication Data

US 2025/0046321 A1 Feb. 6, 2025

Related U.S. Application Data

(60) Provisional application No. 63/530,124, filed on Aug. 1, 2023.

(51) Int. Cl.

| | |
|---|---|
| ***G10L 19/032*** | (2013.01) |
| ***G10L 19/002*** | (2013.01) |
| ***G10L 19/008*** | (2013.01) |
| ***G10L 19/20*** | (2013.01) |
| ***G10L 19/24*** | (2013.01) |

(52) U.S. Cl.

CPC .......... *G10L 19/032* (2013.01); *G10L 19/002* (2013.01); *G10L 19/008* (2013.01); *G10L 19/20* (2013.01); *G10L 19/24* (2013.01)

(58) Field of Classification Search

CPC ................. G10L 19/032; G10L 19/002; G10L 19/008; G10L 19/20; G10L 19/24

See application file for complete search history.

(56) References Cited

U.S. PATENT DOCUMENTS

| | | | |
|---|---|---|---|
| 8,422,546 B2 | 4/2013 | Lin et al. | |
| 8,693,713 B2 | 4/2014 | Wei-Ge et al. | |
| 9,646,620 B1 | 5/2017 | Oh et al. | |
| 9,805,725 B2 | 10/2017 | Crockett et al. | |
| 2015/0332680 A1* | 11/2015 | Crockett ................ | G10L 19/20 381/23 |

(Continued)

FOREIGN PATENT DOCUMENTS

| | | | |
|---|---|---|---|
| CN | 114822564 | A | 7/2022 |
| WO | 2022-156556 | A1 | 7/2022 |
| WO | 2023-086273 | A1 | 5/2023 |

OTHER PUBLICATIONS

International Search Report and Written Opinion dated Jul. 10, 2024 for International Application PCT/KR2024/004333, from Korean Intellectual Property Office, pp. 1-9 Republic of Korea.

*Primary Examiner* — David L Ton

(74) *Attorney, Agent, or Firm* — Sherman IP LLP; Kenneth L. Sherman; Steven Laut

(57) ABSTRACT

One embodiment provides a computer-implemented method that includes analyzing, by a computing device, spatial object-based audio content associated with one or more objects. One or more relative perceptual importance metrics of the one or more objects are determined, by the computing device, based on modeling. Based on the one or more relative perceptual importance metrics, resources are allocated, by the computing device, for improving overall audio quality relative to bitrate.

20 Claims, 4 Drawing Sheets

(56) References Cited

U.S. PATENT DOCUMENTS

| | | | | |
|---|---|---|---|---|
| 2016/0104496 | A1* | 4/2016 | Purnhagen | G10L 19/008 381/23 |
| 2016/0225377 | A1 | 8/2016 | Miyasaka et al. | |
| 2017/0105085 | A1 | 4/2017 | Kim et al. | |
| 2017/0180905 | A1* | 6/2017 | Purnhagen | G10L 19/008 |
| 2019/0174246 | A1 | 6/2019 | De Bruijn et al. | |
| 2020/0402522 | A1 | 12/2020 | Olivieri et al. | |
| 2022/0319524 | A1 | 10/2022 | Eksler | |
| 2022/0383885 | A1 | 12/2022 | Dillen et al. | |
| 2023/0052666 | A1 | 2/2023 | Schmidt | |
| 2023/0368801 | A1* | 11/2023 | Meng | G10L 25/21 |

* cited by examiner

CODEC BITRATE SELECTION IN AUDIO OBJECT CODING

CROSS-REFERENCE TO RELATED APPLICATIONS

This application claims the priority benefit of U.S. Provisional Patent Application Ser. No. 63/530,124, filed on Aug. 1, 2023, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to codec bitrates, and in particular, to providing codec bitrate selection in audio object coding.

BACKGROUND

Immersive audio is gaining popularity for consumer audio. One important aspect of immersive audio delivery is audio coding, which involves transmission of audio data with an efficient perceptual quality versus bitrate tradeoff. While there are open-source tools such as Opus codec that are competitive for traditional audio formats such as stereo, there are aspects of newer immersive formats that are not well addressed. In fact, the Opus codec, for example, does not handle more than two channels (stereo format) within the core codec itself, and thus cannot optimally exploit correlations and divide bitrates jointly among the channels.

In addition to new multichannel formats (such as 7.1.4., etc.), and scene-based audio, object-based content may also require special handling. "Audio object" can refer to or can involve a stem track that has both audio data and spatial position metadata. The immersive format uses this positional metadata to render objects so that they remain agnostic to the listening setup, and the same content can be listened with, for example, headphones or a multi-speaker setup.

Typically, the objects are not interactive in that their relative levels do not change in playback. More than channels, objects can also vary much in their sparsity (e.g., proportion of inactivity) and overall perceptual importance. Also, the number of objects in particular content can potentially be large due to the nature of the content creation process.

SUMMARY

One embodiment provides a computer-implemented method that includes analyzing, by a computing device, spatial object-based audio content associated with one or more objects. One or more relative perceptual importance metrics of the one or more objects are determined, by the computing device, based on modeling. Based on the one or more relative perceptual importance metrics, resources are allocated, by the computing device, for improving overall audio quality relative to bitrate.

Another embodiment includes a non-transitory processor-readable medium that includes a program that when executed by a processor provides codec bitrate selection in audio object coding including analyzing, by the processor, spatial object-based audio content associated with one or more objects. One or more relative perceptual importance metrics of the one or more objects are determined, by the processor, based on modeling. Based on the one or more relative perceptual importance metrics, resources are allocated, by the processor, for improving overall audio quality relative to bitrate.

Still another embodiment provides an apparatus that includes a memory storing instructions, and at least one processor executes the instructions including a process configured to analyze spatial object-based audio content associated with one or more objects. The one or more relative perceptual importance metrics of the one or more objects are determined based on modeling. Based on the one or more relative perceptual importance metrics, resources are allocated for improving overall audio quality relative to bitrate.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
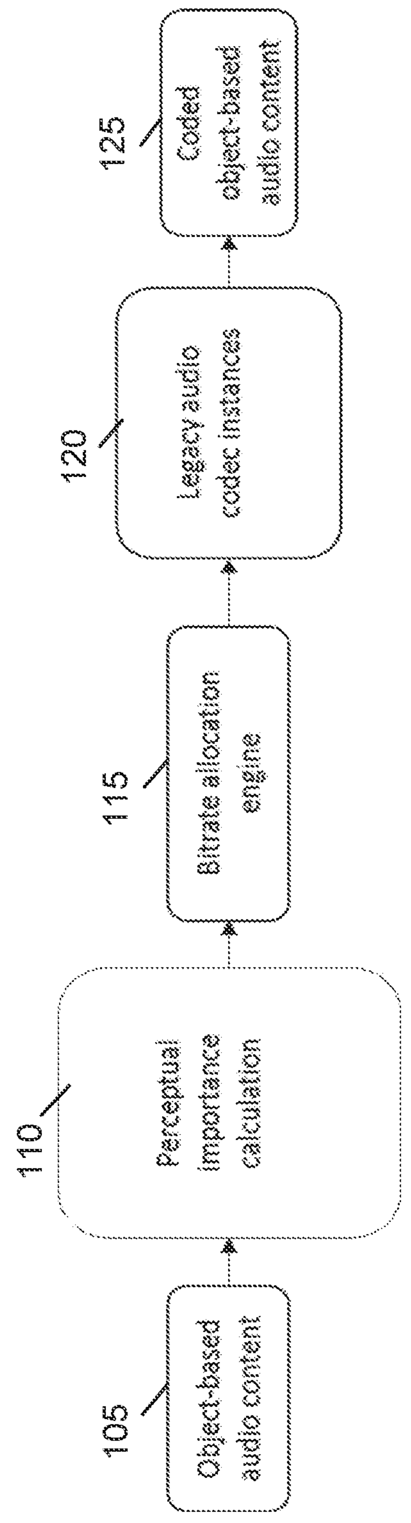
FIG. 1 illustrates a block diagram of a system for codec bitrate selection in audio object coding, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to codec bitrates, and in particular, provides codec bitrate selection in audio object coding. One embodiment provides a computer-implemented method that includes analyzing, by a computing device, spatial object-based audio content associated with one or more objects. One or more relative perceptual importance metrics of the one or more objects are determined, by the computing device, based on modeling. Based on the one or more relative perceptual importance metrics, resources are allocated, by the computing device, for improving overall audio quality relative to bitrate.

In some cases, there are two main options regarding immersive audio coding: 1) proprietary tools that are tailored for immersive content (these include DOLBY© Audio Compression (DOLBY© AC-4) and Moving Picture Experts Group-High Efficiency 3D (MPEG-H 3D)) audio, or 2) open source tools that are competitive in traditional formats such as stereo, but lack in their handling of immersive audio, with Opus being an example. One solution would be to modify open source code directly. However, this may be inefficient and/or costly. Furthermore, there is inertia in adoption of new audio codecs and formats, and many are inclined to use established tools.

Some approaches can use pre- and postprocessing tools that work with a legacy tool such as Opus. Such approaches may improve the capabilities of handling something that the legacy system was not designed for. For instance, there can be some tools for scene-based Ambisonics-format audio. So called channel-mapping techniques combine different Ambisonics channels to several mono- or stereo parts that can then be compressed by a standard codec like Opus, and expanded back at the decoding stage.

Some embodiments provide analyzing spatial object-based audio content associated with one or more objects to determine relative perceptual importance metrics of the one or more objects, based on modeling (e.g., rendering-agnostic psychoacoustic modeling, or modelling that is agnostic to the rendering, or modelling that does not necessarily need or require object positional metadata). One or more embodiments provide allocating, based on the relative perceptual importance metrics, resources including a total available bitrate among the one or more objects in a legacy audio codec (e.g., Opus) for improving (e.g., maximizing) overall audio quality relative to bitrate. Some embodiments provide one or more perceptual measures to analyze one or more object signals of the object-based audio content, where the relative perceptual importance metrics include the one or more perceptual measures. In some embodiments, the one or more perceptual measures are optimized for maximizing local, and overall, audio quality relative to bitrate.

FIG. 1 illustrates a block diagram of a system for codec bitrate selection in audio object coding, according to some embodiments. In one or more embodiments, the system includes, as input, object-based audio content 105, perceptual importance calculation processing 110, bitrate allocation engine 115, legacy audio codec instances 120 and the output of coded object-based audio content 125. In some embodiments, the system analyzes content including one or more audio object time-domain signals. For each object, the system assigns a scalar importance measure from the perceptual importance calculation processing 110. In some embodiments, the set of all these measures is the objects' relative perceptual importance. In some cases, a legacy audio codec, such as Opus, is operated as monophonic, one coding instance per object signal. For each codec instance, a target bitrate can be given as one or more parameters. In some cases, other codec parameters can also be controlled by the importance. The final assigned bitrates may be allocated based on hyperparameters (including one or more of, but not limited to): total available bitrate for all objects (i.e., whole content); low limit bitrate per object; and/or maximum bitrate per object. In some embodiments, the latter two may depend on the codec, and possibly other aspects in some instances.

In some embodiments, an iterative loop assigns the available bit reservoir to each object according to the relative perceptual importance from the perceptual importance calculation processing 110. In case there is overflow over the maximum rate (e.g., maximum bitrate per object), those bits may be set as the new bit reservoir, and the process can be repeated until the reservoir is depleted.

Figure 2:
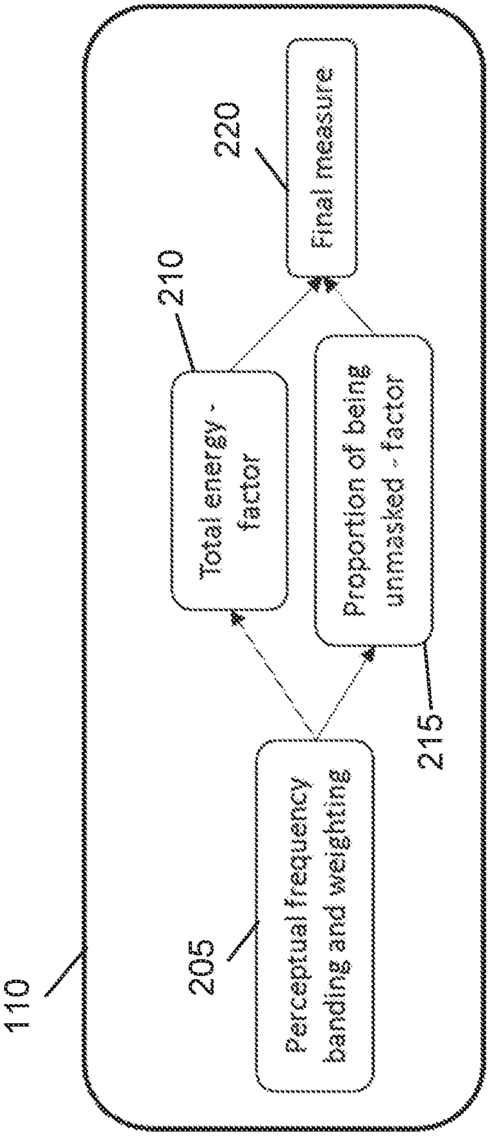
FIG. 2 illustrates a block diagram for perceptual importance computation processing, according to some embodiments.

FIG. 2 illustrates a block diagram for perceptual importance computation processing 110, according to some embodiments. In one or more embodiments, the perceptual importance computation processing 110 includes perceptual frequency banding and weighting processing 205, total energy-factor processing 210, proportion of being unmasked-factor processing 215 and a final measure processing 220. In some embodiments, the disclosed technology can combine multiple (e.g., two) factors in a perceptual importance measure. First, intuitively a signal that has more total energy would need more bits in order to represent its audio well, compared to a signal that is mostly silent. For this, the total energy-factor processing 210 computes the 1) total energy-factor as the sum of perceptually weighted band energies (from the perceptual frequency banding and weighting processing 205). The proportion of being unmasked-factor processing 215 analyzes 2) how much each object audio is masked by the other objects. If assuming a masking model in a reverberant room, the masking signal can be approximated by the sum of all objects in the content. The masking signal (i.e., "sum signal") can also include signals that are not in the object content, but are playing simultaneously. Then the proportion of the masker signal can be compared to each individual object signal in perceptual frequency bands and time frames, and the average unmasked perceptually energy of each object signal can be computed. Less artifacts can be assigned if the object is listened solo at any point without any masking signals. An assumption can be that even a temporally local artifact can be detrimental to the overall quality. This can complement the total energy factor with a local unmasking average. While the overall quality impression of an audio segment as a whole is important, there can be another important part of the content that can be very short in duration. In some cases, the second factor is more important for some tests (e.g., key tests), so the final measure 220 can be computed as the weighted sum of the two factors with, for example, relations 0.2 and 0.8.

Figure 3:
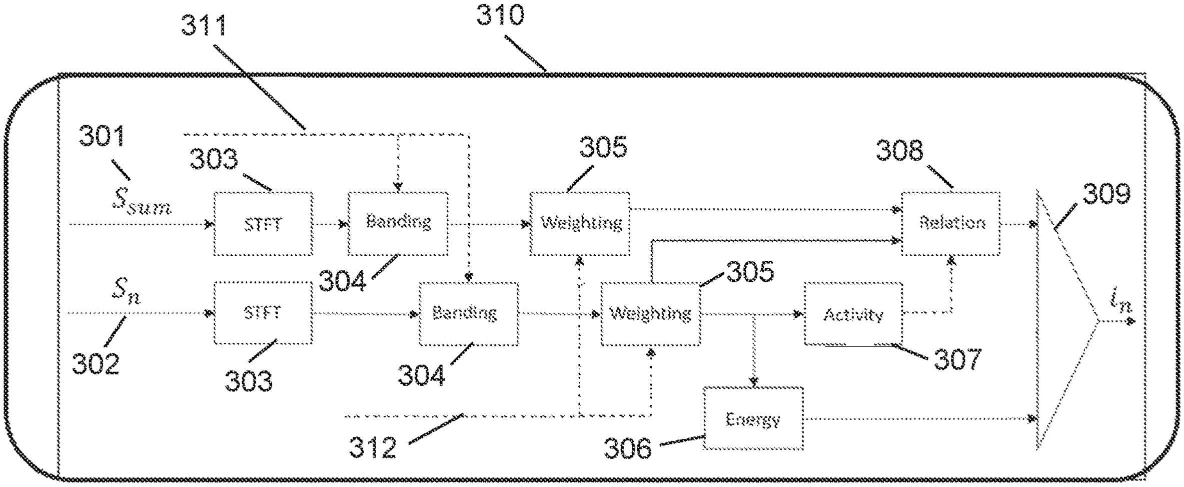
FIG. 3 illustrates a block diagram for details of the perceptual importance computation processing, according to some embodiments.

FIG. 3 illustrates a block diagram 310 for details of the perceptual importance computation processing, according to some embodiments. In one or more embodiments, starting from the audio signal vectors for the $n^{th}$ individual object $S_n$ 302, and the sum of all signals $S_{sum}$ 301, these are transformed to frequency domain via Short-Time Fourier Transforms (STFT) 303. Each STFT signal is grouped into perceptual frequency bands, that in this case originate from the banding used in the codec. Banding is given a priori via STFT bin indices 311, and the energy of each frequency band normalized by the number of bins in the band is calculated for each time frame 304. A priori relative perceptual importance per frequency band 312 is utilized to weight each band (banding 305) similarly in each sum signal and the individual object signal. This weighting originates from the relative bit assignment in the core audio codec, where typically low-frequency bands are assigned more importance. Total perceptual weighted energy is calculated for the object signal (energy 306). Activity detection block 307 is used to find the non-silent segments of the object signal and at those time frames, the perceptual energy of the frequency bands c compared against the perceptual energy of the sum signal, and averaged over time, and then summed over frequency bands (relation 308). The final scalar importance measure is calculated as the weighted sum of the two factors (total object perceptual energy, and relative energy average compared to sum signal) 309.

Figure 4:
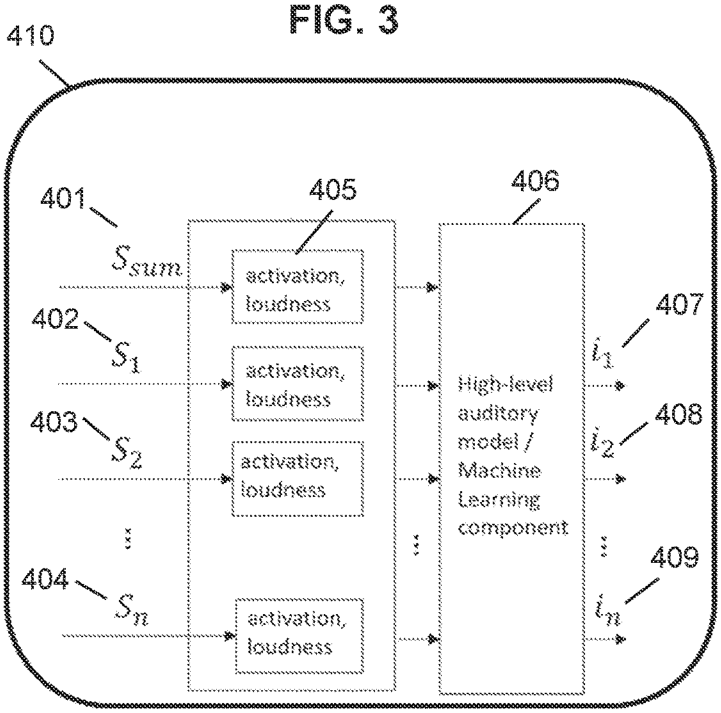
FIG. 4 illustrates another block diagram for perceptual importance computation processing, according to some embodiments.

FIG. 4 illustrates another block diagram 410 for perceptual importance computation processing, according to some embodiments. In one embodiment, the disclosed technology can use a more complicated auditory loudness and masking model 405 that also simulates, for example, cochlea neural activity ("activation") and calculates specific loudness and masking patterns per object signal ($S_{sum}$ 401, $S_1$ 402, $S_2$ 403, . . . $S_n$ 404). A higher-level auditory perception model 406 can be utilized to calculate relative object importance measures based on perceptual unmasking. Some embodiments can remain rending-agnostic (i.e., may not need or require object positional metadata). In some cases, this can be implemented with machine learning (ML) components. In some cases, the ML components can be based on (e.g., trained on) given training data. In some instances, based on the relative importance provided by the higher-level auditory perception model 406, the final bitrates can be assigned as with the example associated with the block diagram 310 (FIG. 3), and the final measures are output ($i_1$ 407, $i_2$ 408 . . . $i_n$ 409).

Figure 5:
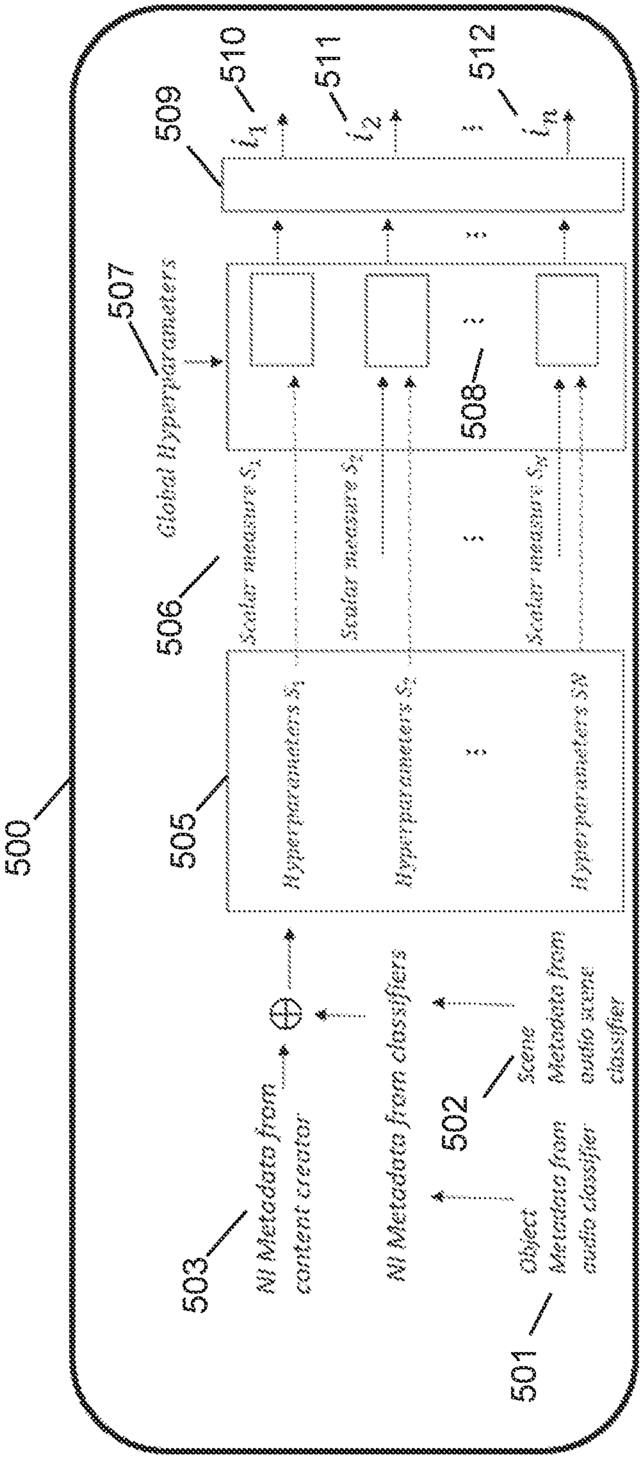
FIG. 5 illustrates a block diagram for narrative and perceptual importance computation processing, according to some embodiments.

FIG. 5 illustrates a block diagram 500 for narrative and perceptual importance computation processing, according to some embodiments. In one or more embodiments, through a plugin software embedded in a Digital Audio Workstation 503, a content creator can author Narrative Importance (NI) Metadata for certain objects in the object-based audio mix. The NI metadata may be for the whole audio mix or specific to a certain subsection(s) or scene(s). In some embodiments, relevant audio elements may be identified using Audio Classification. NI Metadata may be generated either from a non-context aware approach using an Audio Classification Model (object metadata from Audio classifier 501) and may depend (in some cases, may depend only) on the class of each audio object or from a context aware approach: in addition to the audio classification for each object, an Audio Scene Classification Model (scene metadata from audio scene classifier 502) can be used to get the specific context for each scene. The NI of each objects' class is computed relatively to the specific context of the scene and can vary from scene to scene. The NI metadata may be used to adjust particular hyperparameters 505 ($\text{Hyperparameters}_{S_1}$, $\text{Hyperparameters}_{S_3}$ . . . $\text{Hyperparameters}_{S_N}$) for individual objects during the bitrate per object allocation algorithm 508 after the Scalar measure 506 (Scalar measure $S_1$, Scalar measure $S_2$ . . . Scalar measure $S_N$) has been computed. These object specific hyperparameters 505 can override global hyperparameters 507 if NI metadata is present. For example, objects marked with NI can be given a higher maximum and minimum individual bitrate than objects without this metadata. This allows for the bit allocation algorithm 508 to prioritize objects with NI while still following the energy-based bit allocation. This results in NI Aware Bit Allocation 509 with output ($i_1$. 510, $i_2$ 511 . . . $i_n$. 512). Bitrates can be assigned as in block 110 (FIG. 2).

Figure 6:
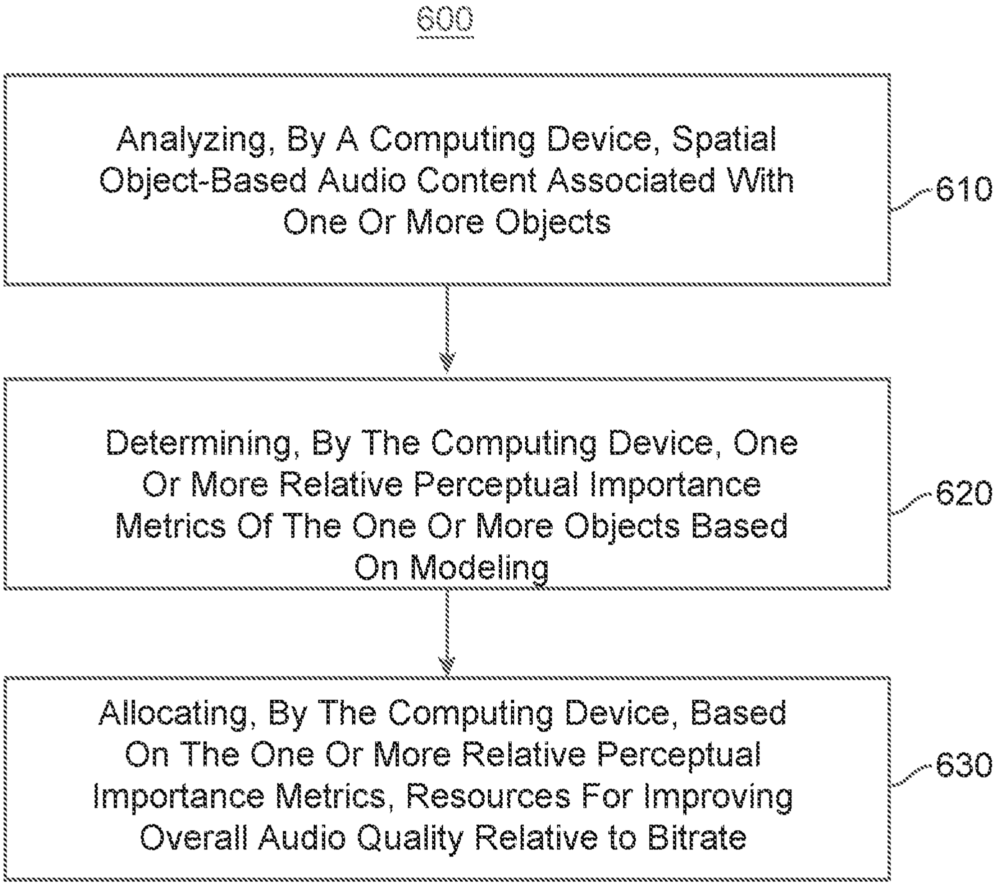
FIG. 6 illustrates a process for codec bitrate selection in audio object coding, according to some embodiments.

FIG. 6 illustrates a process 600 for codec bitrate selection in audio object coding, according to some embodiments. In block 610, process 600 analyzes, by a computing device, spatial object-based audio content associated with one or more objects. In block 620, process 600 determines one or more relative perceptual importance metrics of the one or more objects based on modeling. In block 630, process 600 allocates, based on the one or more relative perceptual importance metrics, resources for improving overall audio quality relative to bitrate.

In some embodiments, process 600 includes the feature that the modeling includes rendering-agnostic psychoacoustic modeling.

In one or more embodiments, process 600 further includes the feature that one or more perceptual measures are provided to analyze one or more object signals of the spatial object-based audio content. The relative perceptual importance metrics include the one or more perceptual measures.

In one or more embodiments, process 600 additionally provides that improving the overall audio quality relative to bitrate includes maximizing the overall audio quality relative to bitrate.

In some embodiments, process 600 still further provides the feature that the one or more perceptual measures are optimized for maximizing local and overall audio quality relative to bitrate.

In one or more embodiments, process 600 additionally provides the feature that the resources include a total available bitrate among the one or more objects in a legacy audio codec.

In some embodiments, process 600 further provides the feature that the legacy audio codec includes Opus.

For some embodiments, bitrate/quality tradeoff is significantly improved. In one or more embodiments, the present technology may perform at 480 kbit/s but can still maintain quality as compared to some naïve method at 960 kbit/s, which provides a very significant saving. The present technology is suitable to be deployed as a solution for object-based audio, such as in the Version 2 of the Immersive Audio and Formats (IAMF) and in High Dynamic Range10+ (HDR10+) Audio.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:

analyzing, by a computing device, spatial object-based audio content associated with one or more objects;

determining, by the computing device, one or more relative perceptual importance metrics of the one or more objects based on modeling; and allocating, by the computing device, based on the one or more relative perceptual importance metrics, resources for improving overall audio quality relative to bitrate.

2. The method of claim 1, wherein the modeling comprises rendering-agnostic psychoacoustic modeling.

3. The method of claim 1, further comprising:

providing one or more perceptual measures to analyze one or more object signals of the spatial object-based audio content, wherein the relative perceptual importance metrics include the one or more perceptual measures.

4. The method of claim 1, and wherein improving the overall audio quality relative to bitrate includes maximizing the overall audio quality relative to bitrate.

5. The method of claim 1, wherein the one or more perceptual measures are optimized for maximizing local and overall audio quality relative to bitrate.

6. The method of claim 1, wherein the resources include a total available bitrate among the one or more objects in a legacy audio codec.

7. The method of claim 6, wherein the legacy audio codec includes Opus.

8. A non-transitory processor-readable medium that includes a program that when executed by a processor provides codec bitrate selection in audio object coding, comprising:

analyzing, by the processor, spatial object-based audio content associated with one or more objects;

determining, by the processor, one or more relative perceptual importance metrics of the one or more objects based on modeling; and allocating, by the processor, based on the one or more relative perceptual importance metrics, resources for improving overall audio quality relative to bitrate.

9. The non-transitory processor-readable medium of claim 8, wherein the modeling comprises rendering-agnostic psychoacoustic modeling.

10. The non-transitory processor-readable medium of claim 8, further comprising:

providing one or more perceptual measures to analyze one or more object signals of the spatial object-based audio content, wherein the relative perceptual importance metrics include the one or more perceptual measures.

11. The non-transitory processor-readable medium of claim 8, wherein improving the overall audio quality relative to bitrate includes maximizing the overall audio quality relative to bitrate.

12. The non-transitory processor-readable medium of claim 8, wherein the one or more perceptual measures are optimized for maximizing local and overall audio quality relative to bitrate.

13. The non-transitory processor-readable medium of claim 8, wherein the resources include a total available bitrate among the one or more objects in a legacy audio codec.

14. The non-transitory processor-readable medium of claim 13, wherein the legacy audio codec includes Opus.

15. An apparatus comprising:

a memory storing instructions; and at least one processor executes the instructions including a process configured to:

analyze spatial object-based audio content associated with one or more objects;

determine one or more relative perceptual importance metrics of the one or more objects based on modeling; and allocate, based on the one or more relative perceptual importance metrics, resources for improving overall audio quality relative to bitrate.

16. The apparatus of claim 15, wherein the modeling comprises rendering-agnostic psychoacoustic modeling.

17. The apparatus of claim 15, wherein:

the process is further configured to:

provide one or more perceptual measures to analyze one or more object signals of the spatial object-based audio content; and the relative perceptual importance metrics include the one or more perceptual measures.

18. The apparatus of claim 15, wherein improving the overall audio quality relative to bitrate includes maximizing the overall audio quality relative to bitrate.

19. The apparatus of claim 15, wherein the one or more perceptual measures are optimized for maximizing local and overall audio quality relative to bitrate.

20. The apparatus of claim 19, wherein the resources include a total available bitrate among the one or more objects in a legacy audio codec, and the legacy audio codec includes Opus.

* * * * *